F. M. ROBINSON.
LOCKING DEVICE.
APPLICATION FILED JAN. 2, 1920.

1,358,989.

Patented Nov. 16, 1920.

Witnesses
J. M. Ray
C. E. Van Buren

Inventor
F. M. Robinson
By Bruce King
Atty.

UNITED STATES PATENT OFFICE.

FRANK M. ROBINSON, OF VICTORIA, ILLINOIS.

LOCKING DEVICE.

1,358,989.   Specification of Letters Patent.   Patented Nov. 16, 1920.

Application filed January 2, 1920. Serial No. 348,729.

*To all whom it may concern:*

Be it known that I, FRANK M. ROBINSON, residing at Victoria, Illinois, have invented certain new and useful Improvements in Locking Devices, of which the following, taken in connection with the drawings, is a description.

My invention has for its object the production of a device for locking the steering wheel of a motor vehicle, such as a tractor or the like, when it is desirable to set the steering wheel in a fixed position and leave the operator's hands free for other purposes.

A further object of my invention is to provide such a device which is so constructed and operated that it may be attached to machines as at present made without alterations or changes of any kind.

In the accompanying drawings I have illustrated what I now consider the preferred form of my invention, attached to a tractor known as the Fordson tractor, although I do not wish to be understood as in any way limiting the use of this locking device to a machine like that shown.

Figure 1:
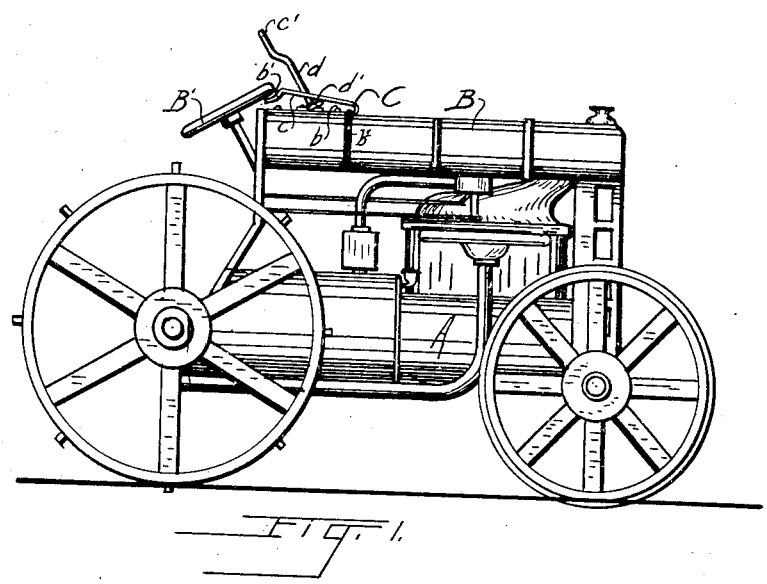
Figure 1 is a side elevation of a tractor showing my locking device attached directly to the gas tank thereof.

Referring to the drawings A represents a conventional form of tractor having the gas tank B mounted on the top thereof as is common with many forms of tractors now in use, such for instance as the Fordson.

The steering wheel B' of the machine is positioned in close proximity to said tank and directly in front of the driver's seat (not here shown). Secured to the top of the tank B by the bands $b'$ or otherwise is one arm of a U-shaped spring, the bent end of which spring extends approximately to the rear end of the gas tank B.

Figure 2:
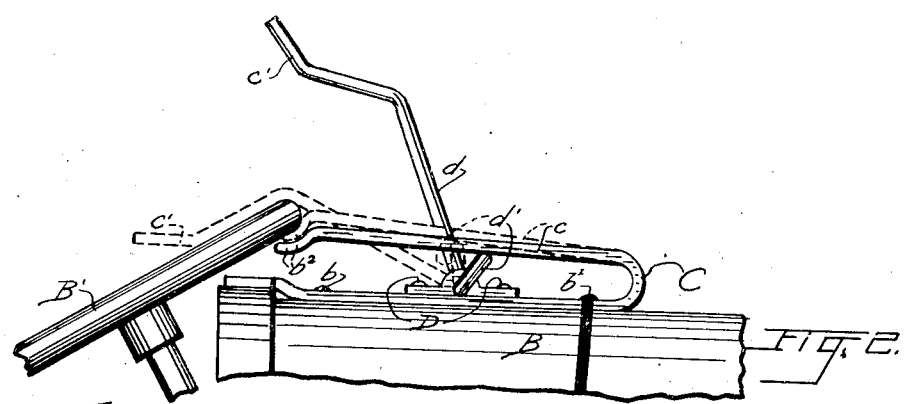
Fig. 2 is an enlarged detail of the locking device illustrating in dotted lines the different positions of the spring operated handle thereof.

The upper free arm of the spring C extends into close proximity to the periphery of the steering wheel B' and the end $b^2$ is bent at an angle as shown more clearly in Fig. 2.

D is a strap fixedly secured at approximately the center of the lower arm of the U-shaped spring C and fulcrumed therein is a lever the long arm $d$ of which is normally in raised position as shown in Fig. 2, the short arm $d'$ is bent at an angle to the long arm $d$, and forms a bearing surface against the fore arm of the spring C.

When the long arm of the lever $d$ is in raised position and the device is out of use, the short arm normally rests between the two arms of the U-shaped spring.

When the operator desires to lock the steering wheel in fixed position he pulls the lever $d$ downwardly into the position shown in dotted lines in Fig. 2 which action has also turned the short arm $d'$ of the lever to the position shown in Fig. 2, bearing against the upper arm C of the U-shaped spring and raising it so that the bent end thereof, $b'$ comes into contact with the rim of the steering wheel B', and by frictional engagement holds it firmly in position.

To release the steering wheel it is simply necessary to raise the handle $d$ by grasping the end $c'$ thereof which is in convenient position to the steering wheel, and throw it upwardly, which, with a very slight movement carries the short arm $d'$ beyond the center, and the spring arm will serve to hold the parts in their normal position until the long arm of the lever is again depressed.

My locking device is shown in this instance attached to the top of the gas tank of the tractor but it will be understood that I contemplate connecting the attachment to any part of the motor vehicle which will locate the spring arm in the proper position to be brought into contact with the rim of the steering wheel in the manner described.

I claim:

1. A locking device for the steering wheel of a motor vehicle comprising a spring member mounted in operative relation to said steering wheel but normally out of contact therewith, means for forcing said spring member into engagement with the rim of the steering wheel and locking it in fixed position.

2. A locking device for a steering wheel of a motor vehicle comprising a U-shaped member having one arm thereof attached to an immovable part of the vehicle and one arm extending into proximity with the steering wheel, and means for moving said free arm of the spring into engagement with the rim of the steering wheel and maintaining it in fixed position.

3. A locking device for the steering wheel of a motor vehicle comprising a U-shaped spring member one side of which is fixedly secured to an immovable member of the motor vehicle in proximity to the steering wheel thereof, a lever fulcrumed between said spring arms, the long arm of said lever forming the operative handle of the locking device, the short arm thereof adapted to be brought into engagement with the upper arm of said spring to force the free end thereof into engagement with the rim of the steering wheel and lock it against movement.

4. A locking device for a steering wheel of a motor vehicle comprising a U-shaped spring member one side of which is fixedly secured to an immovable part of the motor vehicle, the free end of the opposite side of said arm being bent at an angle thereto and extending normally into close proximity with the steering wheel but normally out of contact therewith, means for forcing said free arm into contact with the rim of the steering wheel and by frictional engagement holding said wheel against movement.

In testimony whereof I have signed this specification.

FRANK M. ROBINSON.